US011404992B2

United States Patent
Nakamura et al.

(10) Patent No.: US 11,404,992 B2
(45) Date of Patent: Aug. 2, 2022

(54) MOTOR CONTROL DEVICE

(71) Applicant: JTEKT CORPORATION, Osaka (JP)

(72) Inventors: Yosuke Nakamura, Okazaki (JP); Hiroshi Kawamura, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/222,448

(22) Filed: Apr. 5, 2021

(65) Prior Publication Data

US 2021/0320607 A1 Oct. 14, 2021

(30) Foreign Application Priority Data

Apr. 8, 2020 (JP) .............................. JP2020-069622

(51) Int. Cl.
*H02P 29/024* (2016.01)

(52) U.S. Cl.
CPC .................................. *H02P 29/024* (2013.01)

(58) Field of Classification Search
CPC .......... H02P 29/024; H02P 6/08; H02P 25/18; H02P 27/08
USPC .................................................. 318/445, 34
See application file for complete search history.

(56) References Cited

U.S. PATENT DOCUMENTS

| 9,912,261 B2 * | 3/2018 | Rattan ................. H02P 23/0077 |
| 2019/0260324 A1 | 8/2019 | Kuramitsu et al. |
| 2019/0326843 A1 | 10/2019 | Kawai et al. |

FOREIGN PATENT DOCUMENTS

| EP | 3 342 678 A1 | 7/2018 |
| WO | 2018/088465 A1 | 5/2018 |

OTHER PUBLICATIONS

Jul. 29, 2021 Extended Search Report issued in European Patent Application No. 21166972.6.

* cited by examiner

*Primary Examiner* — David Luo
(74) *Attorney, Agent, or Firm* — Oliff PLC (57) ABSTRACT

A motor control device includes a plurality of control units corresponding to a plurality of windings which is provided in a motor. The plurality of control units includes a master control unit, a slave control unit, and at least one abnormality monitoring unit. The slave control unit is configured to generate a power supply control command value using information which is acquired through a path other than communication between the control units and which is held for use in control of supply of electric power to the windings in a normal state in which an abnormality in communication between the control units is not detected and to perform backup control for holding the power supply control command value until the abnormality monitoring unit fixes an abnormality in communication between the control units after detecting the abnormality in communication.

8 Claims, 6 Drawing Sheets

MOTOR CONTROL DEVICE

CROSS-REFERENCE TO RELATED APPLICATION

This application claims priority to Japanese Patent Application No. 2020-069622 filed on Apr. 8, 2020, incorporated herein by reference in its entirety.

BACKGROUND

1. Technical Field

The disclosure relates to a motor control device.

2. Description of Related Art

A control device that controls operation of a motor which is a source for an assist torque applied to a steering mechanism of a vehicle is known. For example, a control device described in WO 2018/088465 controls supply of electric power to windings of two systems. The control device includes two control units corresponding to the windings of two systems.

The control device described in WO 2018/088465 controls supply of electric power to the windings of two systems under the control of the control units based on various types of information acquired through communications between the control units. In this case, in order to cope with an abnormality in communication between the control units based on disconnection of a communication line between the control units, bit garbling of a signal due to superimposition of noise, or the like, the control units hold a value acquired through communication from the other control unit as a hold value when an abnormality in communication is not detected. The control units perform control using the hold value until an abnormality in communication is actually fixed after having been detected, whereby control using erroneous information is prevented from being performed.

SUMMARY

In the control device described in WO 2018/088465, it is necessary to individually provide a dedicated storage area such that the hold value is not rewritten and held using abnormal details when updated due to an abnormality in communication between the control units before the hold value which is held to cope with an abnormality in communication between the control units is acquired.

The disclosure provides a motor control device that can reduce a scale of change for adding a constituent required for coping with an abnormality in communication between control units.

A motor control device according to an aspect of the disclosure includes a plurality of control units corresponding to a plurality of windings which is provided in a motor. The motor control device is configured to control supply of electric power to the windings under the control of the plurality of control units based on various types of information acquired through communication between the plurality of control units. The plurality of control units includes a master control unit configured to generate a power supply control command value for controlling a motor torque generated by the motor as control information required for controlling supply of electric power to the windings and a slave control unit configured to control supply of electric power to the corresponding winding based on the newest power supply control command value by updating the power supply control command value generated by the master control unit when the power supply control command value is acquired through the communication between the control units. The plurality of control units includes at least one abnormality monitoring unit configured to detect an abnormality in communication between the control units and to monitor a series of states until the abnormality is fixed when a predetermined condition is satisfied after the abnormality has been detected. The slave control unit is configured to generate the power supply control command value using information which is acquired through a path other than the communication between the control units and which is held for use in control of supply of electric power to the windings in a normal state in which an abnormality in communication between the control units has not been detected, instead of the power supply control command value which is updated whenever the power supply control command value is acquired through the communication between the control units, and to perform backup control for holding the power supply control command value until the abnormality monitoring unit fixes an abnormality in communication between the control units after detecting an abnormality in communication.

According to this aspect, since the power supply control command value which is used for the slave control unit to perform the backup control is generated by the slave control unit using information which is acquired through a path other than the communication between the control units, the likelihood of an abnormality occurring due to an abnormality in communication between the control units is low even when an abnormality in communication is detected. That is, the information which is acquired by the slave control unit through a path other than the communication between the control units does not cause a problem even if the information is updated and rewritten when the abnormality in communication between the control units is detected. Accordingly, it is not necessary to individually provide a dedicated storage area for isolating the information or the like before information for generating the power supply control command value when the slave control unit performs the backup control is secured in addition to a storage area which is used for a normal operation to secure the information. As a result, it is possible to reduce a scale of change for adding a constituent required for coping with an abnormality in communication between the control units.

In the aspect, the slave control unit may be configured to use an actual current value which is a current value flowing in the corresponding winding as the information which is held for use in control of supply of electric power to the windings in the state in which the communication between the control unit is normal until the abnormality monitoring unit fixes an abnormality in communication between the control units after detecting the abnormality in communication.

With this configuration, when the slave control unit is switched to perform the backup control, it is possible to curb sudden change of supply of electric power to the winding corresponding to the slave control unit and to curb sudden change of a motor torque.

In the aspect, the slave control unit may be configured to use a value of zero as the information which is held for use in control of supply of electric power to the windings in the state in which the communication between the control unit is normal until the abnormality monitoring unit fixes an abnormality in communication between the control units after detecting the abnormality in communication.

With this configuration, while the slave control unit is performing the backup control, it is possible to stop supply of electric power to the winding corresponding to the slave control unit and to prevent the motor torque from becoming abnormal.

In this case, it is possible to prevent the motor torque from becoming abnormal, but there is a likelihood that a situation in which the motor torque is insufficient will occur. In the aspect, the master control unit may be configured to control the abnormality monitoring unit such that an amount of electric power supplied to the corresponding winding is increased in comparison with a state in which the communication between the control units is normal using the power supply control command value when the slave control unit is performing the backup control until the abnormality monitoring unit fixes an abnormality in communication between the control units after detecting the abnormality in communication.

With this configuration, on the assumption that supply of electric power to the winding corresponding to the slave control unit is stopped while the slave control unit is performing the backup control, it is possible to prevent the motor torque from becoming abnormal and to curb occurrence of a situation in which the motor torque is insufficient.

In the aspect, the slave control unit may be configured to generate a slave-side power supply control command value using the same method as in the master control unit as information corresponding to the power supply control command value which is generated in the master control unit when the abnormality monitoring unit determines that the communication between the control unit is in the normal state, and the slave control unit may be configured to use the slave-side power supply control command value as the information which is held for use in control of supply of electric power to the windings in a state in which the communication between the control units is normal until the abnormality monitoring unit fixes an abnormality in communication between the control units after detecting the abnormality in communication.

With this configuration, when the slave control unit is switched to perform the backup control, it is possible to curb sudden change of electric power supplied to the winding corresponding to the slave control unit and to curb sudden change of the motor torque.

In the aspect, the power supply control command value may include a current command value for feedback-controlling an actual current value which is a current value flowing in the windings for the supply of electric power and a torque command value which is generated by the master control unit to generate the current command value. In the aspect, the power supply control command value may be a torque command value for generating a current command value for feedback-controlling an actual current value which is a current value flowing in the windings for the supply of electric power. In the aspect, the power supply control command value may be a current command value for feedback-controlling an actual current value which is a current value flowing in the windings for the supply of electric power.

With the motor control device according to the aspect, it is possible to reduce a scale of change for adding a constituent required for coping with an abnormality in communication between control units.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
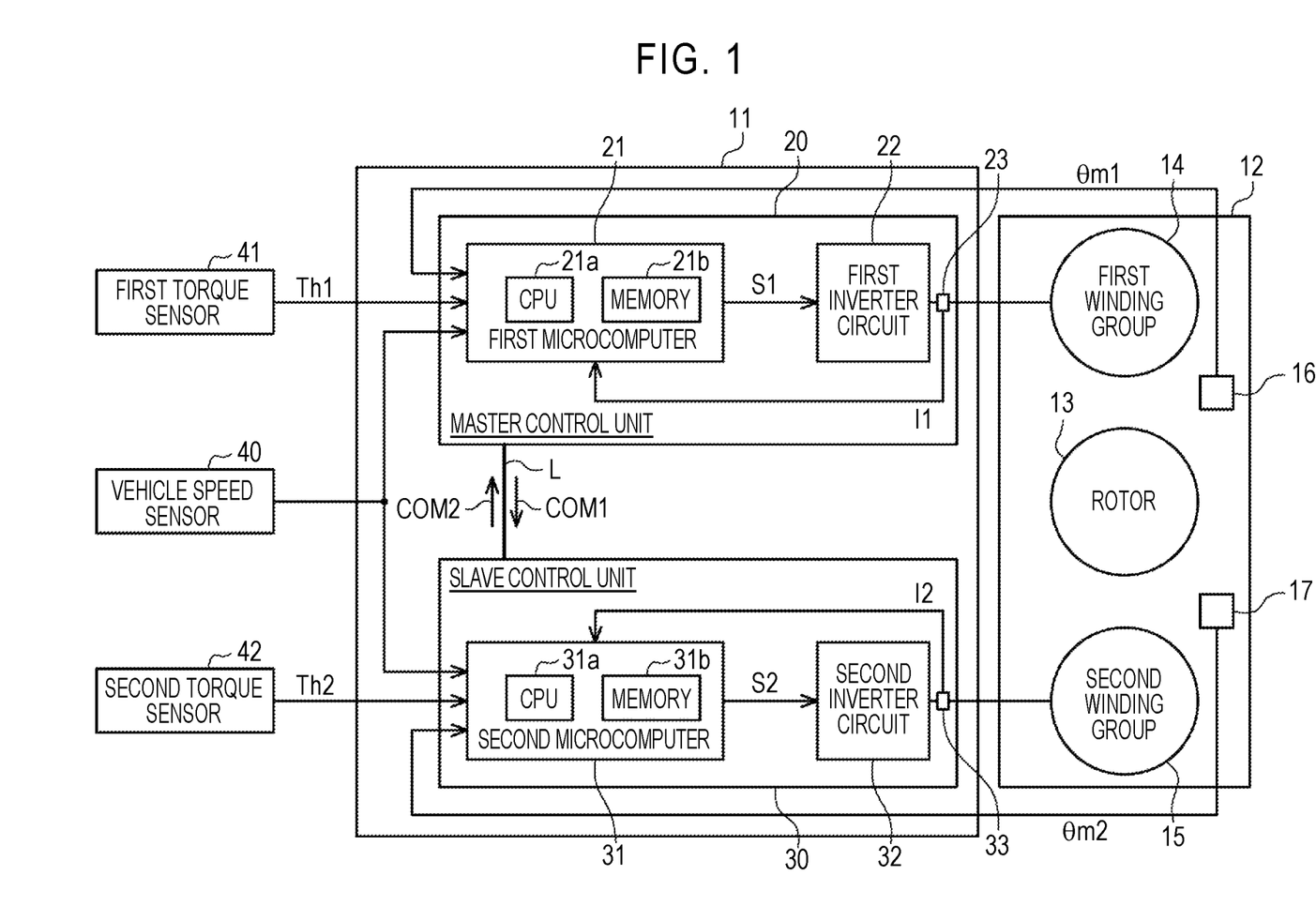
FIG. 1 is a diagram schematically illustrating a configuration of a motor control device.

Hereinafter, a motor control device according to a first embodiment will be described with reference to the accompanying drawings. As illustrated in FIG. 1, the motor control device 11 controls operation of a motor 12. The motor control device 11 is, for example, a control unit that applies a motor torque to a steering mechanism of a vehicle and performs power steering control for assisting with a driver's steering operation or the like by controlling the operation of the motor 12.

The motor 12 is a three-phase brushless motor. The motor 12 includes a rotor 13, a first winding group 14, a second winding group 15, a first rotation angle sensor 16, and a second rotation angle sensor 17. Each of the first winding group 14 and the second winding group 15 includes a U-phase coil, a V-phase coil, and a W-phase coil. The first rotation angle sensor 16 and the second rotation angle sensor 17 detect rotation angles $\theta m1$ and $\theta m2$ of the rotor 13 of the motor 12.

The motor control device 11 and the motor 12, that is, the first winding group 14 and the second winding group 15, are connected to each other via a bus bar or a cable, or the like. The motor control device 11 controls supply of electric power to the first winding group 14 and the second winding group 15 for each system. The motor control device 11 includes a master control unit 20 that is a first control unit configured to control supply of electric power to the first winding group 14 and a slave control unit 30 that is a second control unit configured to control supply of electric power to the second winding group 15.

The master control unit 20 includes a first microcomputer 21 that is a control circuit (hereinafter referred to as a "first microcomputer"), a first inverter circuit 22, and a first current sensor 23.

The first rotation angle sensor 16, the first current sensor 23, a vehicle speed sensor 40, and a first torque sensor 41 are connected to the first microcomputer 21. The first current sensor 23 detects an actual current value I1 which is a current value flowing in the first winding group 14. The actual current value I1 is detected as phase current values generated in a power supply path between the first inverter circuit 22 and the first winding group 14. In FIG. 1, for the purpose of convenience of description, connection lines of phases and current sensors of phases are collectively illustrated as being single. The vehicle speed sensor 40 detects a vehicle speed value V which is a value indicating a vehicle speed which is a travel speed of the vehicle. The first torque sensor 41 detects a steering torque Th1 which is a value indicating a torque applied to a steering mechanism by a driver's steering operation.

The first microcomputer 21 generates a command signal S1 which is a PWM signal for the first inverter circuit 22. The first microcomputer 21 controls supply of electric power to the first winding group 14 using the rotation angle θm1 and the actual current value I1.

The first inverter circuit 22 is a PWM type three-phase inverter and converts DC electric power supplied from a DC power source to three-phase AC electric power by causing switching elements of phases to switch based on the command signal S1 generated by the first microcomputer 21. A current corresponding to the command signal S1 is supplied to the first winding group 14 via the first inverter circuit 22.

The slave control unit 30 basically has the same configuration as the master control unit 20. That is, the slave control unit 30 includes a second microcomputer 31 that is a control circuit (hereinafter referred to as a "second microcomputer"), a second inverter circuit 32, and a second current sensor 33.

The second rotation angle sensor 17, the second current sensor 33, the vehicle speed sensor 40, and a second torque sensor 42 are connected to the second microcomputer 31. The second current sensor 33 detects an actual current value I2 which is a current value flowing in the second winding group 15. The actual current value I2 is detected as phase current values generated in a power supply path between the second inverter circuit 32 and the second winding group 15. In FIG. 1, for the purpose of convenience of description, connection lines of phases and current sensors of phases are collectively illustrated as being single. The second torque sensor 42 detects a steering torque Th2 which is a value indicating a torque applied to the steering mechanism by a driver's steering operation.

The second microcomputer 31 generates a command signal S2 which is a PWM signal for the second inverter circuit 32. The second microcomputer 31 controls supply of electric power to the second winding group 15 using the rotation angle θm2 and the actual current value I2.

The second inverter circuit 32 is a PWM type three-phase inverter and converts DC electric power supplied from a DC power source to three-phase AC electric power by causing switching elements of phases to switch based on the command signal S2 generated by the second microcomputer 31. A current corresponding to the command signal S2 is supplied to the second winding group 15 via the second inverter circuit 32.

The first microcomputer 21 and the second microcomputer 31 transmit and receive digital signals as information to and from each other via a communication bus L. For example, a serial peripheral interface (SPI) which is a kind of standard of synchronous serial communication is employed as a standard of communication via the communication bus L which is performed between the first microcomputer 21 and the second microcomputer 31.

The first microcomputer 21 generates various signals COM1 including a signal indicating a state of a system to which the first microcomputer 21 belongs as the digital signals and transmits the generated signals COM1 to the second microcomputer 31 via the communication bus L. The second microcomputer 31 generates various signals COM2 including a signal indicating a state of a system to which the second microcomputer 31 belongs as the digital signals and transmits the generated signals COM2 to the first microcomputer 21 via the communication bus L. Information indicated by the signals COM1 and COM2 which are acquired with the communication bus L as a path in this way is updated with newest information by the microcomputers 21 and 31 having received the signals whenever the signals are acquired in each of predetermined operation cycles.

Functions of the first microcomputer 21 and the second microcomputer 31 will be described below. The microcomputers 21 and 31 include CPUs 21a and 31a which are central processing units not illustrated in the drawing and memories 21b and 31b, and the CPUs 21a and 31a execute programs stored in the memories 21b and 31b in each of predetermined operation cycles. Accordingly, various processes are performed.

Figure 2:
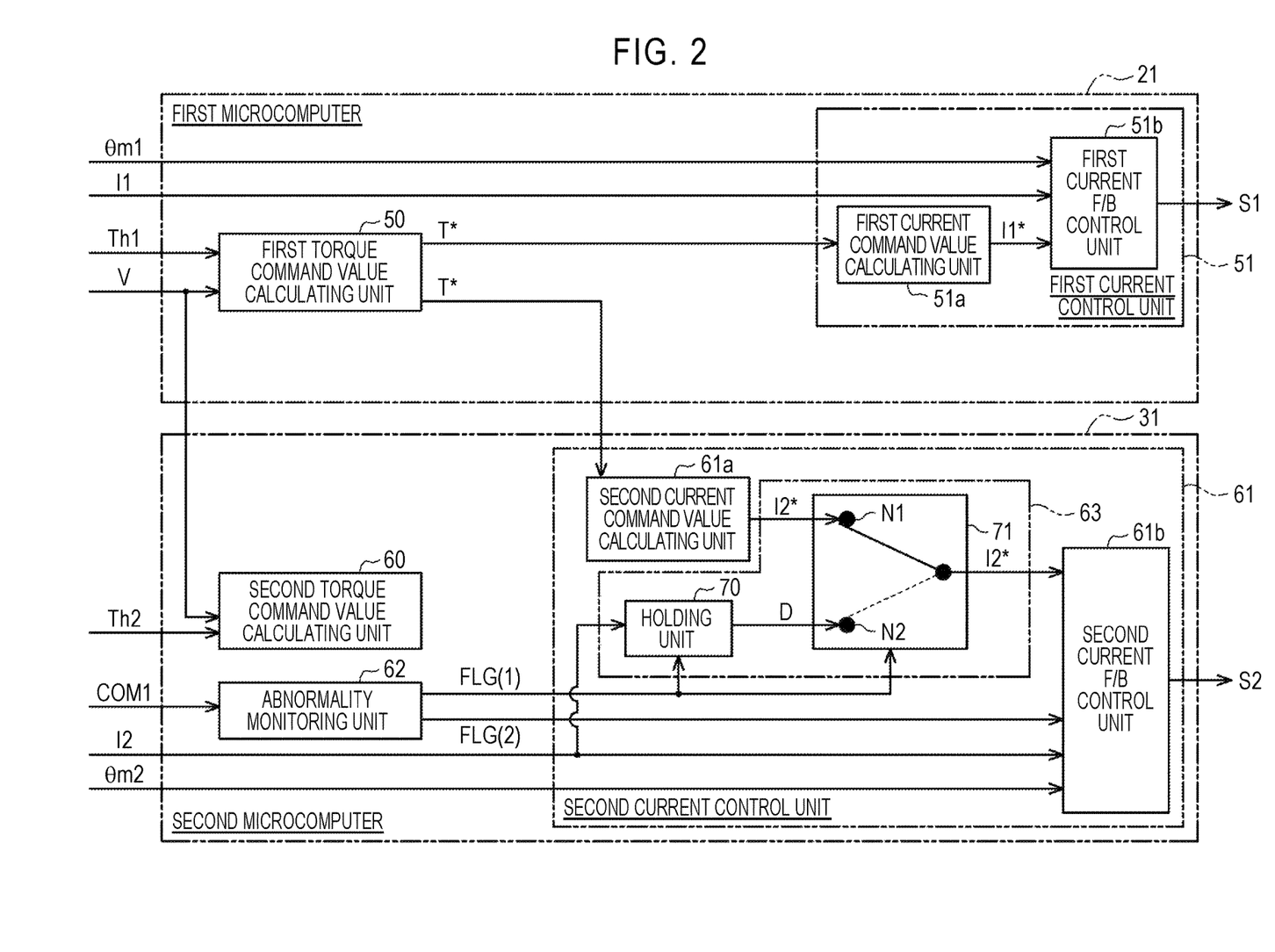
FIG. 2 is a block diagram illustrating functions of microcomputers of the motor control device according to a first embodiment.

FIG. 2 illustrates some processes which are performed by the microcomputers 21 and 31. The processes illustrated in FIG. 2 are some processes which are realized by causing the CPUs 21a and 31a to execute programs stored in the memories 21b and 31b by types of the realized processes.

The rotation angle θm1, the actual current value I1, the steering torque Th1, and the vehicle speed value V are input to the first microcomputer 21. The first microcomputer 21 generates and outputs the command signal S1 based on these input state variables.

Specifically, the first microcomputer 21 includes a first torque command value calculating unit 50 that calculates a torque command value T* and a first current control unit 51 that calculates the command signal S1. The steering torque Th1 and the vehicle speed value V are input to the first torque command value calculating unit 50. The first torque command value calculating unit 50 calculates the torque command value T* based on the input state variables. The generated torque command value T* is output to the first current control unit 51 and is output as one of the signals COM1 to the second microcomputer 31 via the communication bus L. The torque command value T* is set to a current value which is required for the first winding group 14 and the second winding group 15 to generate a half (50%) of a generated torque which is a total torque required for the motor 12.

The first current control unit 51 includes a first current command value calculating unit 51a that calculates a current command value I1* and a first current F/B control unit 51b that generates the command signal S1. The torque command value T* is input to the first current command value calculating unit 51a. The first current command value calculating unit 51a calculates the current command value I1* in the dq coordinate system based on the torque command value T*. The calculated current command value I1* is output to the first current F/B control unit 51b.

The current command value I1*, the rotation angle θm1, and the actual current value I1 are input to the first current F/B control unit 51b. The first current F/B control unit 51b calculates the actual current value in the dq coordinate system by mapping the actual current value I1 onto dq coordinates based on the rotation angle θm1. The first current F/B control unit 51b generates the command signal S1 by performing current feedback control based on current differences on the coordinates such that the actual current value in the dq coordinate system conforms to the current command value I1* in the dq coordinate system. The generated command signal S1 is output to the first inverter circuit 22. Accordingly, driving electric power corresponding to the command signal S1 is supplied to the first winding group 14 from the first inverter circuit 22.

The torque command value T* generated by the first microcomputer 21, the rotation angle θm2, the actual current value I2, the steering torque Th2, and the vehicle speed value V are input to the second microcomputer 31. The second microcomputer 31 generates and outputs the command signal S2 based on these input state variables.

Specifically, the second microcomputer 31 includes a second torque command value calculating unit 60 that calculates a slave-side torque command value TS* which is information corresponding to the torque command value T* generated by the first microcomputer 21 and a second current control unit 61 that calculates the command signal S2.

The steering torque Th2 and the vehicle speed value V are input to the second torque command value calculating unit 60. The second torque command value calculating unit 60 calculates the slave-side torque command value TS* based on the input state variables. The generated slave-side torque command value TS* is output as one of the signals COM2 to the first microcomputer 21 via the communication bus L. The slave-side torque command value TS* is calculated using the same method as in the first microcomputer 21 and can be said to be an estimated torque command value which is calculated by estimating the torque command value T*. The slave-side torque command value TS* is used for the microcomputers 21 and 31 to monitor whether an abnormality has occurred therein by comparison with the torque command value T* generated by the first microcomputer 21.

The second current control unit 61 includes a second current command value calculating unit 61a that calculates a current command value I2*, a second current F/B control unit 61b that generates the command signal S2, and a command value switching unit 63 that selects an appropriate value of the current command value I2*.

The torque command value T* generated by the first microcomputer 21 is input to the second current command value calculating unit 61a. The second current command value calculating unit 61a calculates the current command value I2* in the dq coordinate system based on the torque command value T*. The calculated current command value I2* is output to the command value switching unit 63, and the current command value I2* is selected as an appropriate value by the command value switching unit 63 and is output as a final current command value I2* to the second current F/B control unit 61b.

The final current command value I2* selected as an appropriate value by the command value switching unit 63, the rotation angle θm2, and the actual current value I2 are input to the second current F/B control unit 61b. The second current F/B control unit 61b calculates the actual current value in the dq coordinate system by mapping the actual current value I2 onto dq coordinates based on the rotation angle θm2. The second current F/B control unit 61b generates the command signal S2 by performing current feedback control based on current differences on the coordinates such that the actual current value in the dq coordinate system conforms to the current command value I2* in the dq coordinate system. The generated command signal S2 is output to the second inverter circuit 32. Accordingly, driving electric power corresponding to the command signal S2 is supplied to the second winding group 15 from the second inverter circuit 32.

In this embodiment, basically, that is, at the time of performing a normal operation, driving electric power is supplied to the first winding group 14 and the second winding group 15 based on the torque command value T* which is generated by the first microcomputer 21 and shared via the communication bus L by the microcomputers 21 and 31. When there is an abnormality in communication between the microcomputers such as based on disconnection of the communication bus L, fixation of a value, or the like, the second microcomputer 31 cannot acquire the torque command value T* which is generated by the first microcomputer 21. The abnormality in communication between the microcomputers includes an abnormality which can be restored to a normal state and an abnormality which cannot be restored to the normal state. When an abnormality which can be restored to the normal state occurs, it is considered that it is preferable for the second microcomputer 31 to continuously supply electric power to the second winding group 15 even if the torque command value T* generated by the first microcomputer 21 cannot be acquired on the assumption that the abnormality will be restored to the normal state. For the purpose of realization thereof, the second microcomputer 31 is configured to perform backup control for appropriately maintaining driving of the motor 12 when there is an abnormality in communication between the microcomputers and the abnormality can be restored to the normal state. A function associated with the backup control will be described below in detail.

As illustrated in FIG. 2, the second microcomputer 31 includes an abnormality monitoring unit 62 that serves to monitor a situation of communication between the microcomputers and a command value switching unit 63 that serves to switch the torque command value T* to an appropriate value depending on the situation of communication between the microcomputers.

The signals COM1 including the torque command value T* which is transmitted by the first microcomputer 21 are input to the abnormality monitoring unit 62. The abnormality monitoring unit 62 detects an abnormality in communication between the microcomputers based on the signals COM1 and monitors a series of situations until an abnormality is fixed when a predetermined condition is satisfied after the abnormality has been detected.

Specifically, the abnormality monitoring unit 62 monitors a "normal state" in which the signals COM1 can be received, a "state in which an abnormality is detected" in which it can be determined that an abnormality occurs and can be restored to the normal state, and a "state in which the abnormality is fixed" in which it can be determined that an abnormality occurs and can be restored to the normal state and the signals COM1 cannot be received as communication states of the communication between the microcomputers. These communication states are monitored based on the number of times of non-reception of the signals COM1. The signals COM1 are non-received when the signals cannot be received at an appropriate timing or when the signals can be received at an appropriate timing and there is an abnormality in checksum of the values thereof. The signals COM1 are also non-received when the absolute values thereof are greater than upper limit values in design or when information indicating an abnormality of the first microcomputer 21 is included therein.

For example, the abnormality monitoring unit 62 counts the number of times of non-reception which is the successive number of times of non-reception of the signals COM1, and determines that it is a state in which the communication between the microcomputers is normal, that is, an error active state, when the number of times of non-reception is less than a threshold number of times. For example, the threshold number of times is several times such as two times.

When the number of times of non-reception is equal to or greater than the threshold number of times and duration of this state is less than a threshold time, the abnormality monitoring unit 62 determines that it is a state in which an abnormality in communication between the microcomputers is detected, that is, an error passive state. For example, the threshold time is several seconds such as one second. When the number of times of non-reception is less than the threshold number of times, the abnormality monitoring unit 62 determines that the communication between the microcomputers is restored to the normal state.

When the number of times of non-reception is equal to or greater than the threshold number of times and this state continues for the threshold time, the abnormality monitoring unit 62 determines that the predetermined condition is satisfied and it is a state in which an abnormality in communication between the microcomputers is fixed, that is, a bus-off state. The state in which the abnormality in communication between the microcomputers is fixed is a state which cannot be restored to the normal state unless a special condition is satisfied such as communication reset.

Then, the abnormality monitoring unit 62 generates an abnormality flag FLG based on the communication state of the communication between the microcomputers. The abnormality monitoring unit 62 does not generate the abnormality flag FLG in the state in which the communication between the microcomputers is normal. When an abnormality in communication between the microcomputers is detected, the abnormality monitoring unit 62 generates an abnormality flag FLG(1) as information indicating that fact. When the abnormality in communication between the microcomputers is fixed, the abnormality monitoring unit 62 generates an abnormality flag FLG(2) as information indicating that fact. The generated abnormality flag FLG(1) is output to the command value switching unit 63 and the generated abnormality flag FLG(2) is output to the second current control unit 61. When the abnormality flag FLG(2) is input, the second current control unit 61 stops generation and output of the command signal S2 such that supply of electric power to the second winding group 15 is stopped. The abnormality flag FLG(2) may be output to the second inverter circuit 32. In this case, when the abnormality flag FLG (2) is input, the second inverter circuit 32 stops its operation such that supply of electric power to the second winding group 15 is stopped.

The command value switching unit 63 includes a holding unit 70 that holds an appropriate value as the current command value I2* in the state in which the communication between the microcomputers is not normal and a switching unit 71 that switches a selection state of a value which is output as the final current command value I2* according to the communication state of the communication between the microcomputers.

The actual current value I2 and the abnormality flag FLG(1) are input to the holding unit 70. When the abnormality flag FLG(1) is input while the actual current value I2 varying from time to time is being input and updated in each of predetermined operation cycles, the holding unit 70 stores the value of the actual current value I2 which is input at the corresponding input timing as a hold value D. Here, the actual current value I2 which is held is an actual current value in the dq coordinate system which is mapped onto the dq coordinates based on the rotation angle θm2, and may be an actual current value in the dq coordinate system which is calculated by the second current FB control unit 61b.

When the state in which the abnormality flag FLG(1) has been input continues after the abnormality flag FLG(1) has been input, the holding unit 70 may stop inputting of the actual current value I2. The actual current value I2 is information which is acquired through a path different from the communication bus L via which the microcomputers communicate and which is secured in each of predetermined operation cycles by the second microcomputer 31 for the purpose of use in control of supply of electric power to the second winding group 15. The actual current value I2 which is stored as the hold value D is information which is secured by the second microcomputer 31 for the purpose of use in control of supply of electric power to the second winding group 15 in the state in which the communication between the microcomputers is normal and is information which is secured just before an abnormality in communication between the microcomputers has been detected.

The hold value D is temporarily stored and held in an area in which the value of the current command value I2* is to be stored in a predetermined storage area of the memory 31b of the second microcomputer 31 while the abnormality flag FLG(1) is being input. The storage area in which the hold value D is stored is not a storage area which is individually secured for backup control but is a storage area which has been used from the normal operation. That is, the function of the holding unit 70 is to store the actual current value I2 at the time at which the abnormality flag FLG(1) is input in the predetermined storage area of the memory 31b such that it can be used as the value of the current command value I2*. When the abnormality flag FLG(1) is not input, the hold value D is deleted by updating the predetermined storage area of the memory 31b of the second microcomputer 31. In this case, the holding unit 70 can release stop of the input when inputting of the actual current value I2 is stopped. The stored hold value D is output to the switching unit 71.

The abnormality flag FLG(1), the current command value I2* generated by the second current command value calculating unit 61a and the hold value D held by the holding unit 70 are input to the switching unit 71. The current command value I2* is input to a first input N1 of the switching unit 71 and the hold value D is input to a second input N2 of the switching unit 71. The switching unit 71 controls a selection state of a command value such that the current command value I2* input to the first input N1 is output as a final current command value I2* to the second current F/B control unit 61b when the abnormality flag FLG(1) is not input. On the other hand, when the abnormality flag FLG(1) is input in the selection state in which the current command value I2* input to the first input N1 is output to the second current F/B control unit 61b, the switching unit 71 controls the selection state of the command value such that the hold value D input to the second input N2 is output as the final current command value I2* to the second current F/B control unit 61b. The selection state in which the hold value D is output as the final current command value I2* is continuously maintained while the abnormality flag FLG(1) is being input. The selection state in which the hold value D is output as the final current command value I2* is controlled to the selection state in which the current command value I2* input to the first input N1 is output when the abnormality flag FLG(1) is not input. The abnormality flag FLG(2) may be input to the switching unit 71. In this case, while the abnormality flag FLG(2) is being input, the selection state in which the hold value D is output as the current command value I2* may be maintained or outputting of the current command value I2* may be stopped.

Regarding the final current command value I2* which is selected as an appropriate value in this way, the current command value I2* which is generated based on the torque command value T* transmitted from the first microcomputer 21 is output to the second current F/B control unit 61b while the abnormality flag FLG(1) is not being input. Regarding the final current command value I2*, the hold value D instead of the current command value I2* generated based on the torque command value T* transmitted from the first microcomputer 21 is output to the second current F/B control unit 61*b* while the abnormality flag FLG(1) is being input.

That is, the second microcomputer 31 performs backup control for controlling supply of electric power to the second winding group 15 under the control of the second current F/B control unit 61*b* using the hold value D as the current command value I2* instead of the current command value I2* generated based on the torque command value T* transmitted from the first microcomputer 21 when an abnormality in communication between the microcomputers is detected. In this embodiment, the power supply control command value includes the torque command value T* and the current command value I2*.

Operations of this embodiment will be described below. According to this embodiment, the current command value I2* which is used for the second microcomputer 31 to perform backup control is generated using the actual current value I2 which is information acquired through a path different from that of the communication between the microcomputers by the second microcomputer 31. Accordingly, even when an abnormality in communication between the microcomputers is detected, the likelihood that an abnormality would have occurred due to the detected abnormality is low. That is, the information which is acquired through a path different from that of the communication between the microcomputers by the second microcomputer 31 does not cause a problem even when the information is updated and rewritten while an abnormality in communication between the microcomputers is detected. Accordingly, in the memory 31*b* of the second microcomputer 31, it is not necessary to individually provide a dedicated storage area for isolating information or the like before the information for generating the current command value I2* when the second microcomputer 31 performs the backup control is secured in addition to the storage area which is used for the normal operation in order to secure the information.

Advantages of this embodiment will be described below.

(1) In this embodiment, the current command value I2* which is used for the second microcomputer 31 to perform the backup control is generated using the actual current value I2 which is information which is acquired through a path other than the communication between the microcomputers by the second microcomputer 31. Accordingly, it is possible to reduce a scale of change for adding a constituent required for coping with an abnormality in communication between the microcomputers.

(2) In this embodiment, the current command value I2* which is used for the second microcomputer 31 to perform the backup control is generated using the actual current value I2. Accordingly, when the second microcomputer 31 is switched to perform the backup control, it is possible to curb sudden change of supply of electric power to the second winding group 15 and to curb sudden change of the motor torque.

Second Embodiment

A motor control device according to a second embodiment will be described below. The same elements as in the aforementioned embodiment and the like will be referred to by the same reference signs and description thereof will not be repeated.

Figure 3:
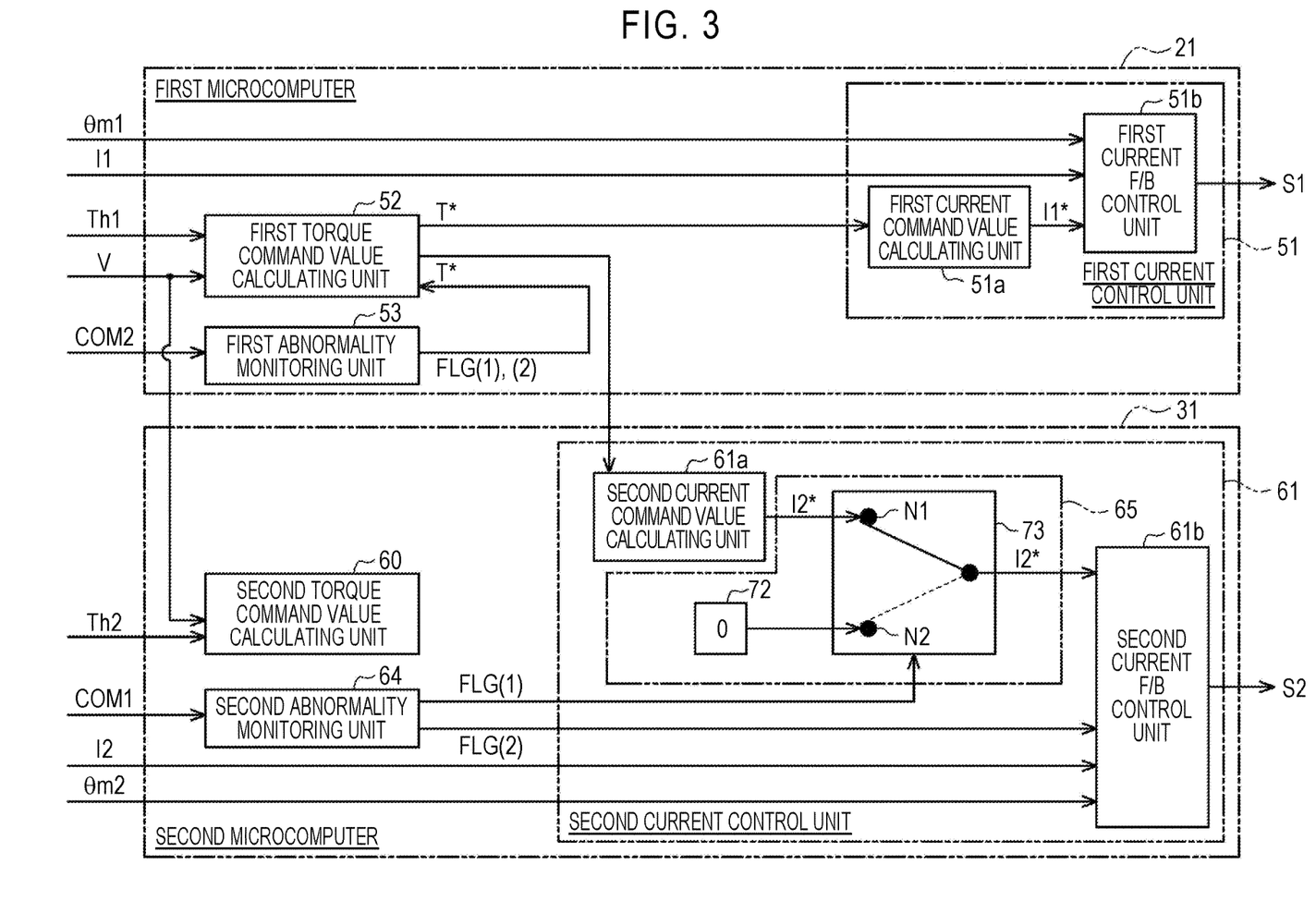
FIG. 3 is a block diagram illustrating functions of microcomputers according to a second embodiment.

As illustrated in FIG. 3, the first microcomputer 21 according to this embodiment includes a first torque command value calculating unit 52 and a first abnormality monitoring unit 53. The signals COM2 including a slave-side torque command value TS* transmitted from the second microcomputer 31 are input to the first abnormality monitoring unit 53. The first abnormality monitoring unit 53 detects an abnormality in communication between the microcomputers based on the signals COM2 using the same method as in the abnormality monitoring unit 62 according to the first embodiment and monitors a series of states until the abnormality is fixed when a predetermined condition is satisfied after the abnormality has been detected.

The first abnormality monitoring unit 53 does not generate an abnormality flag FLG in a state in which the communication between the microcomputers is normal. When an abnormality in communication between the microcomputers is detected, the first abnormality monitoring unit 53 generates an abnormality flag FLG(1) as information indicating that fact. When the abnormality in communication between the microcomputers is fixed, the first abnormality monitoring unit 53 generates an abnormality flag FLG(2) as information indicating that fact. The generated abnormality flags FLG(1) and FLG(2) are output to the first torque command value calculating unit 52.

When the abnormality flags FLG(1) and FLG(2) are input, the first torque command value calculating unit 52 generates the torque command value T* which is set to a value which doubles that in the state in which the communication between the microcomputers is normal such that the current command value I1* which is required for generating the total (100%) generated torque required for the motor 12 is generated by the first winding group 14. That is, the current command value I1* generated by the first current command value calculating unit 51*a* is set to a value which doubles that in the state in which the communication between the microcomputers to which the abnormality flags FLG(1) and FLG(2) are not input is normal such that an amount of electric power supplied to the first winding group 14 is increased.

The second microcomputer 31 according to this embodiment includes a second abnormality monitoring unit 64 and a command value switching unit 65. The second abnormality monitoring unit 64 is the same as the abnormality monitoring unit 62 according to the first embodiment.

The command value switching unit 65 includes a storage unit 72 that stores an appropriate value as the current command value I2* in the state in which the communication between the microcomputers is not normal and a switching unit 73 that switches the selection state of the value which is output as the final current command value I2* according to the communication state of the communication between the microcomputers.

The storage unit 72 is a predetermined storage area of the memory 31*b* in which the "value of zero (0)" which is used, for example, to set an initial value of the command signal S1 in a starting process of the second microcomputer 31 or the like is stored. The "value of zero (0)" is information which is acquired through a path different from the communication bus L via which the microcomputers communicate with each other and which is secured in advance in the predetermined storage area used by the second microcomputer 31 from the time at which the memory 31*b* operates normally for the purpose of use in control of supply of electric power to the second winding group 15, and is information which is secured regardless of the communication state of the communication between the microcomputers. The "value of zero (0)" which is stored in this way is connected to a second input N2 of the switching unit 73.

The "value of zero (0)" is normally input to the second input N2 of the switching unit 73. The switching unit 73 controls the selection state of the command value such that the current command value I2* input to a first input N1 thereof is output as the final current command value I2* to the second current F/B control unit 61b while the abnormality flag FLG(1) is not being input. On the other hand, when the abnormality flag FLG(1) is input in the selection state in which the current command value I2* input to the first input N1 is output to the second current F/B control unit 61b, the switching unit 73 control the selection state of the command value such that the "value of zero (0)" input to the second input N2 is output as the final current command value I2* to the second current F/B control unit 61b. The selection state in which the "value of zero (0)" is output as the current command value I2* is continuously maintained while the abnormality flag FLG(1) is being input. The selection state in which the "value of zero (0)" is output as the current command value I2* is controlled to the selection state in which the current command value I2* input to the first input N1 is output when the abnormality flag FLG(1) is not input. The abnormality flag FLG(2) may be input to the switching unit 73. In this case, in a situation in which the abnormality flag FLG(2) is input, the selection state in which the "value of zero (0)" is output as the final current command value I2* may be maintained or outputting of the final current command value I2* may be stopped.

That is, while an abnormality in communication between the microcomputers is being detected, the second microcomputer 31 performs backup control for controlling supply of electric power to the second winding group 15 under the control of the second current FB control unit 61b using the "value of zero (0)" as the current command value I2* instead of the current command value I2* which is generated based on the torque command value T* transmitted from the first microcomputer 21.

According to this embodiment, the same operations and advantages as in the first embodiment can be achieved. The following advantages can be further achieved. (3) In this embodiment, the current command value I2* which is used for the second microcomputer 31 to perform the backup control is generated using the "value of zero (0)." Accordingly, while the second microcomputer 31 is performing the backup control, it is possible to stop supply of electric power to the second winding group 15 and to curb the motor torque from being abnormal.

(4) In this embodiment, the current command value I2* which is set to a value which doubles that in the state in which the communication between the microcomputers is normal is generated such that the first microcomputer 21 increases the amount of electric power supplied to the first winding group 14 while the second microcomputer 31 is performing the backup control. Accordingly, on the assumption that supply of electric power to the second winding group 15 is stopped while the second microcomputer 31 is performing the backup control, it is possible to curb the motor torque from becoming abnormal and to curb occurrence of a situation in which the motor torque is insufficient.

Third Embodiment

A motor control device according to a third embodiment will be described below. The same elements as in the aforementioned embodiments and the like will be referred to by the same reference signs and description thereof will not be repeated.

Figure 4:
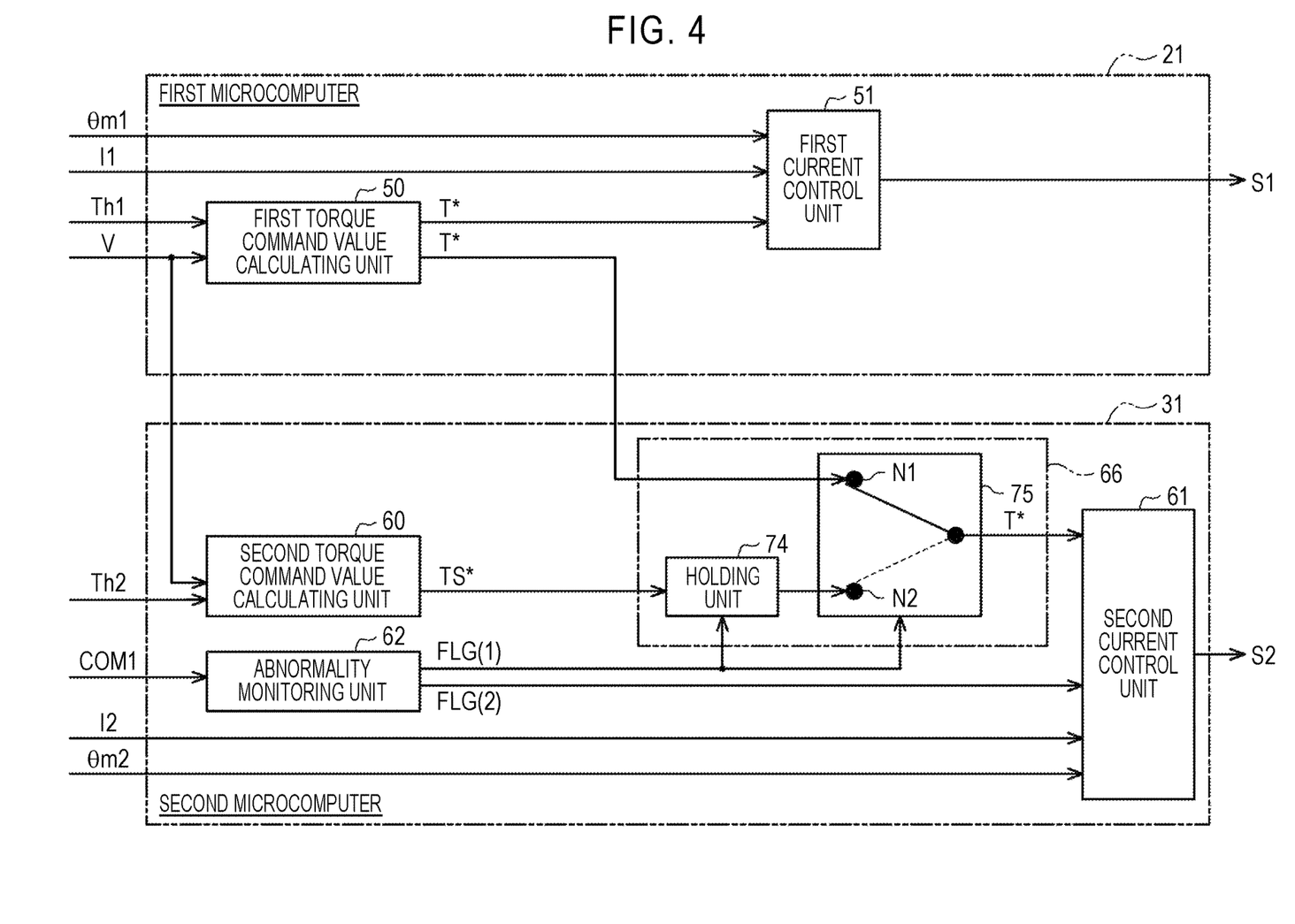
FIG. 4 is a block diagram illustrating functions of microcomputers according to a third embodiment.

As illustrated in FIG. 4, the second microcomputer 31 according to this embodiment includes a command value switching unit 66 instead of the command value switching unit 63 according to the first embodiment. The command value switching unit 66 has the same configuration as the command value switching unit 63 according to the first embodiment, except that a value held by the holding unit 74 is different.

The command value switching unit 66 is provided between the second torque command value calculating unit 60 and the second current control unit 61. The command value switching unit 66 includes a holding unit 74 that holds an appropriate value as a torque command value T* in a state in which communication between the microcomputers is not normal and a switching unit 75 that switches a selection state of a value which is output as the final torque command value T* according to a communication state of the communication between the microcomputers.

In the command value switching unit 66, a slave-side torque command value TS* and an abnormality flag FLG(1) are input to the holding unit 74. When the abnormality flag FLG(1) is input while the slave-side torque command value TS* varying from time to time is being input and updated in each of predetermined operation cycles, the holding unit 74 stores the slave-side torque command value TS* which is input at the corresponding input timing as a hold value D. When the state in which the abnormality flag FLG(1) has been input continues after the abnormality flag FLG(1) has been input, the holding unit 74 may stop inputting of the slave-side torque command value TS*. The slave-side torque command value TS* is information which is acquired through a path different from the communication bus L via which the microcomputers communicate and which is secured in each of predetermined operation cycles by the second microcomputer 31 for the purpose of use in control of supply of electric power to the second winding group 15. The slave-side torque command value TS* which is stored as the hold value D is information which is secured by the second microcomputer 31 for the purpose of use in control of supply of electric power to the second winding group 15 in the state in which the communication between the microcomputers is normal and is information which is secured just before an abnormality in communication between the microcomputers has been detected. In this embodiment, the power supply control command value is the torque command value T* and the slave-side power supply control command value is the slave-side torque command value TS*.

The abnormality flag FLG(1), the torque command value T* generated by the first microcomputer 21, and the hold value D held by the holding unit 74 are input to the switching unit 75. The torque command value T* is input to a first input N1 of the switching unit 75 and the hold value D is input to a second input N2 of the switching unit 75. The switching unit 75 controls the selection state of the command value such that the torque command value T* input to the first input N1 is output as the final torque command value T* to the second current control unit 61 while the abnormality flag FLG(1) is not being input. On the other hand, when the abnormality flag FLG(1) is input in the selection state in which the torque command value T* input to the first input N1 is output to the second current control unit 61, the switching unit 75 controls the selection state of the command value such that the hold value D input to the second input N2 is output as the final torque command value T* to the second current control unit 61. The selection state in which the hold value D is output as the final torque command value T* is continuously maintained while the abnormality flag FLG(1) is being input. The selection state in which the hold value D is output as the final torque command value T* is controlled to the selection state in which the torque command value T* input to the first input N1 is output when the abnormality flag FLG(1) is not input. The abnormality flag FLG(2) may be input to the switching unit 75. In this case, while the abnormality flag FLG(2) is being input, the selection state in which the hold value D is output as the torque command value T* may be maintained or outputting of the torque command value T* may be stopped.

Regarding the final torque command value T* which is selected as an appropriate value in this way, the torque command value T* which is transmitted from the first microcomputer 21 is output to the second current control unit 61 while the abnormality flag FLG(1) is not being input. Regarding the final torque command value T*, the hold value D instead of the torque command value T* transmitted from the first microcomputer 21 is output to the second current control unit 61 while the abnormality flag FLG(1) is being input.

According to this embodiment, the same operations and advantages as in the first embodiment can be achieved. The following advantages can be further achieved. (5) In this embodiment, the torque command value T* which is used for the second microcomputer 31 to perform the backup control is generated using the slave-side torque command value TS*. Accordingly, when the second microcomputer 31 is switched to perform the backup control, it is possible to curb sudden change of electric power supplied to the second winding group 15 and to curb sudden change of the motor torque.

Fourth Embodiment

Figure 5:
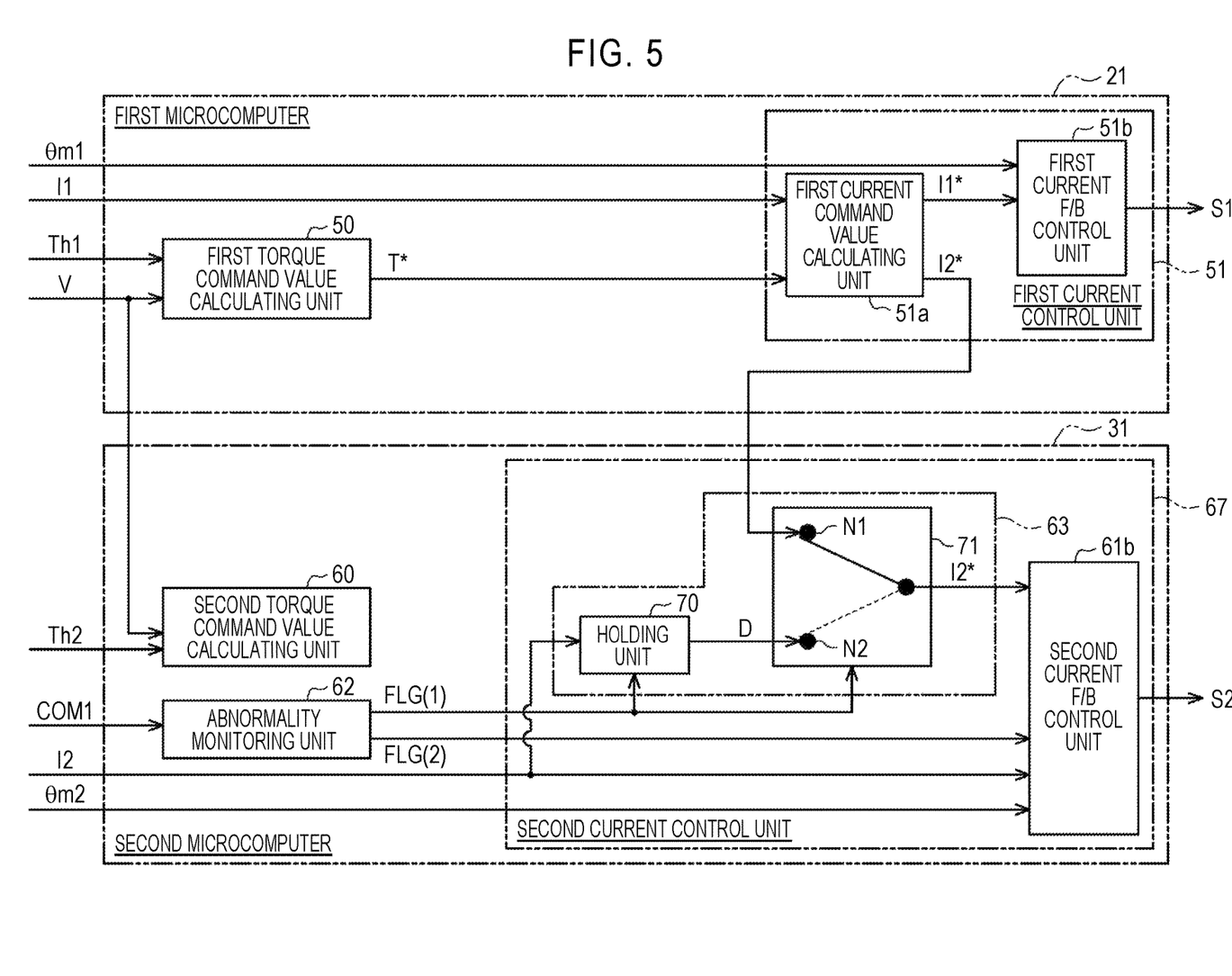
FIG. 5 is a block diagram illustrating functions of microcomputers according to a fourth embodiment.

As illustrated in FIG. 5, the first microcomputer 21 according to this embodiment has the same configuration as the first microcomputer 21 according to the first embodiment, except that the current command value I2* generated by the first current command value calculating unit 51a of the first current control unit 51 instead of the torque command value T* generated by the first torque command value calculating unit 50 is output to the second microcomputer 31 via the communication bus L.

In the second microcomputer 31 according to this embodiment, a second current control unit 67 has the same configuration as the second current control unit 61 according to the first embodiment, except that the second current command value calculating unit 61a according to the first embodiment is not provided.

The first current command value calculating unit 51a calculates the current command value I1* which is set to a current value which is required for the first winding group 14 and the second winding group 15 to generate a half (50%) of a generated torque which is a total torque required for the motor 12. The generated current command value I1* is output to the first current control unit 51 and is output as a current command value I2* which is one of the signals COM1 to the second microcomputer 31 via the communication bus L. The current command value I2* input to the second microcomputer 31 is input to the command value switching unit 63 and is input to the first input N1 of the switching unit 71.

The first torque command value calculating unit 50 generates a torque command value T* which is set to a current value required for the first winding group 14 to generate the total (100%) generated torque required for the motor 12. In this embodiment, the power supply control command value is the current command value I2*.

According to this embodiment, the same operations and advantages as in the first embodiment can be achieved.

Fifth Embodiment

A motor control device according to a fifth embodiment will be described below. The same elements as in the aforementioned embodiment and the like will be referred to by the same reference signs and description thereof will not be repeated.

Figure 6:
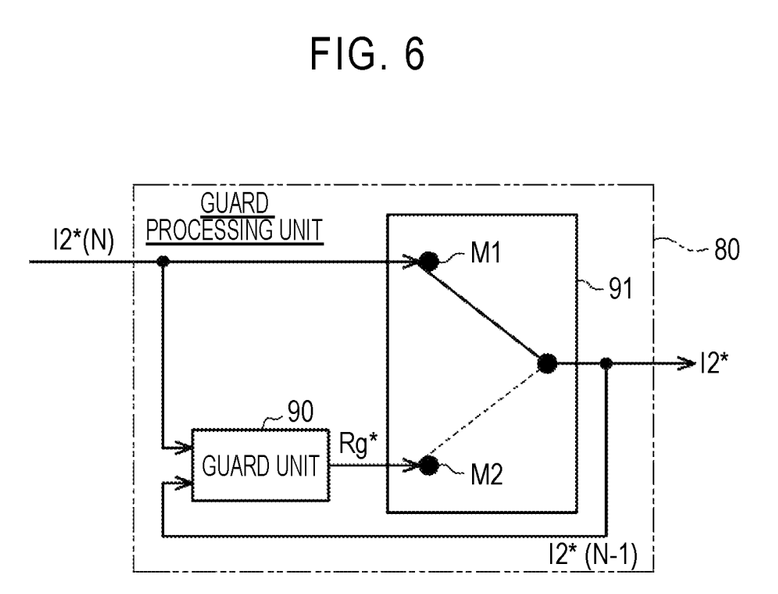
FIG. 6 is a block diagram illustrating a guard processing unit serving as a functional unit of a second microcomputer according to a fifth embodiment.

As illustrated in FIG. 6, the second microcomputer 31 according to this embodiment includes a guard processing unit 80. The guard processing unit 80 is provided between the command value switching unit 63 or 65 and the second current F/B control unit 61b in the first, second, or fourth embodiment.

The guard processing unit 80 includes a guard unit 90 that outputs a guard command value Rg* to curb sudden change of the current command value I2* and a switching unit 91 that switches a selection state of a value which is output as the current command value I2* to curb sudden change of the current command value I2*.

A present current command value I2*(N) which is a current command value I2* output from the command value switching unit 63 or 65 and a previous current command value I2*(N−1) which is a current command value I2* previously output to the second current F/B control unit 61b are input to the guard unit 90. The guard unit 90 calculates the guard command value Rg* based on the present current command value I2*(N) and the previous current command value I2*(N−1). The generated guard command value Rg* is output to the switching unit 91.

Specifically, the guard unit 90 outputs the guard command value Rg* when the present current command value I2*(N) departs from a predetermined allowable range. In this embodiment, the allowable range is a range which is set using a predetermined guard threshold value Gth with respect to the previous current command value I2*(N−1) and which is equal to or less than the absolute value of a value obtained by adding the previous current command value I2*(N−1) and the guard threshold value Gth. The guard command value Rg* is a value obtained by adding the previous current command value I2*(N−1) and the guard threshold value Gth and is a maximum value or a minimum value of an allowable range associated with a change width from the previous value to the present value of the current command value I2*.

For example, when the command value switching unit 63 or 65 switches the selection state, an unexpected shift such as sudden change of the current command value I2* output to the second current F/B control unit 61b before or after the switching may occur. On the other hand, the guard threshold value Gth is set to a value in a range which is acquired by experiment on the assumption that the current command value I2* output to the second current F/B control unit 61b before or after switching the selection state of the command value switching unit 63 or 65 does not change suddenly.

The present current command value I2*(N) output from the command value switching unit 63 or 65 and the guard command value Rg* output from the guard unit 90 are input to the switching unit 91. The present current command value I2*(N) is input to a first input M1 of the switching unit 91 and the guard command value Rg* is input to a second input M2 of the switching unit 91. The switching unit 91 is configured to switch the selection state such that which of the present current command value I2*(N) and the guard command value Rg* is to be output as the current command value I2* is switched.

Specifically, the guard processing unit 80 determines whether the present current command value I2*(N) departs from the allowable range set by the guard unit 90. Then, the guard processing unit 80 controls the selection state of the switching unit 91 based on the present current command value I2*(N). When the present current command value I2*(N) does not depart from the allowable range set by the guard unit 90, the guard processing unit 80 controls the selection state of the switching unit 91 such that the present current command value I2*(N) is output as the current command value I2*. On the other hand, when the present current command value I2*(N) departs from the allowable range set by the guard unit 90, the guard processing unit 80 controls the selection state of the switching unit 91 such that the guard command value Rg* is output as the current command value I2*. The guard processing unit 80 according to this embodiment is provided between the command value switching unit 66 and the second current control unit 61 according to the third embodiment and thus implements the same function as described above.

According to this embodiment, the same operations and advantages as in the aforementioned embodiments can be achieved. The following advantages can be further achieved.

(6) In this embodiment, when the command value switching unit 63 or 65 switches the selection state, the current command value I2* output to the second current F/B control unit 61b may cause an unexpected shift and thus there is a likelihood of sudden change of the motor torque.

Therefore, the guard processing unit 80 is provided between the command value switching unit 63 or 65 and the second current F/B control unit 61b. Accordingly, when the command value switching unit 63 or 65 switches the selection state and the current command value I2* output to the second current F/B control unit 61b has an unexpected shift, this shift is curbed by the guard command value Rg*. Accordingly, it is possible to decrease an influence of switching of the selection state by the command value switching unit 63 or 65 on change of the motor torque. This is the same when this embodiment is applied to the third embodiment.

The aforementioned embodiments can be modified as follows. The embodiments and the following modified examples can be combined with each other unless technical conflict arises. In the first, second, and fourth embodiments, the current command value I2* may vary while the second microcomputer 31 is performing the backup control. For example, in the first embodiment, the current command value I2* may be gradually decreased to the "value of zero (0)" after the current command value I2* has been set to the previous actual current value I2. This configuration can be achieved by combining the second embodiment and the fifth embodiment. In the third embodiment, the slave-side torque command value TS* may be gradually decreased to the "value of zero (0)" after the slave-side torque command value TS* has been set to the torque command value T*.

In the first and third to fifth embodiments, the first abnormality monitoring unit 53 may be provided similarly to the second embodiment. In this case, the first abnormality monitoring unit 53 is configured to output the abnormality flag FLG(2) to the first torque command value calculating unit 50. The first torque command value calculating unit 50 is configured to generate the torque command value T* which is set to a value which doubles that in the state in which the communication between the microcomputers to which the abnormality flag FLG(2) is not input is normal such that the amount of electric power supplied to the first winding group 14 is increased when the abnormality flag FLG(2) is input.

In the second embodiment, the command value which is transmitted from the first microcomputer 21 to the second microcomputer 31 may be the command signal S1, that is the PWM signal, or a voltage command value acquired in the course of generation of the PWM signal. In this case, the actual current value I2 or the rotation angle θm2 acquired by the second microcomputer 31 can be output as one signal of the signals COM2 to the first microcomputer 21 via the communication bus L. In this case, the same advantages as in the second embodiment can be achieved.

In the first, fourth, and fifth embodiments, when the second microcomputer 31 calculates the current command value I2* using the same method as in the first microcomputer 21, the current command value I2* calculated by the second microcomputer 31 may be held by the holding unit 70 as in the third embodiment.

In the second embodiment, the first abnormality monitoring unit 53 may be configured to output only the abnormality flag FLG(2) or the first abnormality monitoring unit 53 may be omitted.

In the second embodiment, the same first torque command value calculating unit 50 as in the other embodiments may be employed instead of the first torque command value calculating unit 52. In the second embodiment, the first torque command value calculating unit 52 may generate the torque command value T* which is set to a value which doubles that in the state in which the communication between the microcomputers is normal only when one of the abnormality flags FLG(1) and FLG(2) is input.

In the first, third, fourth, and fifth embodiments, the abnormality flag FLG(2) may be input to the holding unit 70 or 74. In this case, the holding unit 70 or 74 updates the hold value D to the "value of zero (0)" when the abnormality flag FLG(2) is input.

In the aforementioned embodiments, the first torque command value calculating unit 50 or 52 may not use the vehicle speed value V or may use another factor in combination as long as at least the steering torque Th1 is used to calculate the torque command value T*. This is the same for the second torque command value calculating unit 60 according to the aforementioned embodiments, the vehicle speed value V may not be used or another factor may be used in combination as long as at least the steering torque Th2 is used.

In the fifth embodiment, the guard threshold value Gth may vary based on the vehicle speed value V or another factor. In the fifth embodiment, another method may be used as long as the guard command value Rg* is generated such that the present current command value I2*(N) is in the allowable range set by the guard unit 90.

In the fifth embodiment, the guard unit 90 may be configured to function in one case of a case in which the state in which the communication between the microcomputers is normal changes to a state in which an abnormality is detected and a case in which the state in which an abnormality in communication between the microcomputers is detected changes to the state in which the communication between the microcomputers is normal.

In the aforementioned embodiments, the communication state of the communication between the microcomputers may be determined to be at least a non-received state when the signals COM1 or the signals COM2 cannot be received at an appropriate timing or when the signals can be received at an appropriate timing but the values are abnormal in checksum.

In the aforementioned embodiments, a non-received state may be determined as the communication state of the communication between the microcomputers by detecting various voltages such as operating voltages associated with operations of the microcomputers 21 and 31.

In the aforementioned embodiments, the communication state of the communication between the microcomputers may be detected to be abnormal when the number of times of non-reception is equal to or greater than a second threshold number of times greater than the threshold number of times. In the aforementioned embodiments, the number of communication buses L may be increased to two or more buses to make the communication between the microcomputers redundant. In this case, the communication between the microcomputers is determined to be normal when there is any bus which is normal, the second microcomputer 31 performs the backup control when there is one bus which is normal and an abnormality in the bus is detected, and supply of electric power to the second winding group 15 is stopped when an abnormality is fixed in all the buses.

In the aforementioned embodiment, when an abnormality in communication between the microcomputers is fixed, the second microcomputer 31 may continue to supply electric power to the second winding group 15 based on the slave-side torque command value TS* and operate independently from the first microcomputer 21.

In the aforementioned embodiment, the CPU constituting the motor control device 11 may be realized as a circuit including one or more processors that execute a computer program, or one or more dedicated hardware circuit such as an application-specific integrated circuit that performs at least some of various processes, or a combination of the processor and the dedicated hardware circuit. The memory may be constituted by all available mediums which can be accessed by a general-purpose or dedicated computer.

What is claimed is:

1. A motor control device comprising a plurality of control units corresponding to a plurality of windings which is provided in a motor, wherein:
   the motor control device is configured to control supply of electric power to the windings under the control of the plurality of control units based on various types of information acquired through communication between the plurality of control units;
   the plurality of control units includes a master control unit configured to generate a power supply control command value for controlling a motor torque generated by the motor as control information required for controlling supply of electric power to the windings and a slave control unit configured to control supply of electric power to the corresponding winding based on the newest power supply control command value by updating the power supply control command value generated by the master control unit when the power supply control command value is acquired through the communication between the control units;
   the plurality of control units includes at least one abnormality monitoring unit configured to detect an abnormality in communication between the control units and to monitor a series of states until the abnormality is fixed when a predetermined condition is satisfied after the abnormality has been detected; and
   the slave control unit is configured to generate the power supply control command value using information which is acquired through a path other than the communication between the control units and which is held for use in control of supply of electric power to the windings in a normal state in which an abnormality in communication between the control units has not been detected, instead of the power supply control command value which is updated whenever the power supply control command value is acquired through the communication between the control units, and to perform backup control for holding the power supply control command value until the abnormality monitoring unit fixes an abnormality in communication between the control units after detecting an abnormality in communication.

2. The motor control device according to claim 1, wherein the slave control unit is configured to use an actual current value which is a current value flowing in the corresponding winding as the information which is held for use in control of supply of electric power to the windings in the state in which the communication between the control unit is normal until the abnormality monitoring unit fixes an abnormality in communication between the control units after detecting the abnormality in communication.

3. The motor control device according to claim 1, wherein the slave control unit is configured to use a value of zero as the information which is held for use in control of supply of electric power to the windings in the state in which the communication between the control unit is normal until the abnormality monitoring unit fixes an abnormality in communication between the control units after detecting the abnormality in communication.

4. The motor control device according to claim 3, wherein the master control unit is configured to control the abnormality monitoring unit such that an amount of electric power supplied to the corresponding winding is increased in comparison with a state in which the communication between the control units is normal using the power supply control command value when the slave control unit is performing the backup control until the abnormality monitoring unit fixes an abnormality in communication between the control units after detecting the abnormality in communication.

5. The motor control device according to claim 1, wherein:
   the slave control unit is configured to generate a slave-side power supply control command value using the same method as in the master control unit as information corresponding to the power supply control command value which is generated in the master control unit when the abnormality monitoring unit determines that the communication between the control unit is in the normal state; and
   the slave control unit is configured to use the slave-side power supply control command value as the information which is held for use in control of supply of electric power to the windings in the state in which the communication between the control units is normal until the abnormality monitoring unit fixes an abnormality in communication between the control units after detecting the abnormality in communication.

6. The motor control device according to claim 1, wherein the power supply control command value includes a current command value for feedback-controlling an actual current value which is a current value flowing in the windings for the supply of electric power and a torque command value which is generated by the master control unit to generate the current command value.

7. The motor control device according to claim 1, wherein the power supply control command value is a torque command value for generating a current command value for feedback-controlling an actual current value which is a current value flowing in the windings for the supply of electric power.

8. The motor control device according to claim 1, wherein the power supply control command value is a current command value for feedback-controlling an actual current value which is a current value flowing in the windings for the supply of electric power.

* * * * *